Aug. 26, 1941.  V. G. VAUGHAN ET AL  2,254,054
CONTROL MEANS
Filed Jan. 26, 1937   4 Sheets-Sheet 1

Victor G. Vaughan,
John D. Bolesky,
Inventors
Deloz G. Haynes,
Attorney.

Aug. 26, 1941.     V. G. VAUGHAN ET AL     2,254,054
CONTROL MEANS
Filed Jan. 26, 1937     4 Sheets-Sheet 2

Victor G. Vaughan,
John D. Bolesky,
Inventors,
Delos G. Haynes,
Attorney.

Aug. 26, 1941. V. G. VAUGHAN ET AL 2,254,054
CONTROL MEANS
Filed Jan. 26, 1937  4 Sheets-Sheet 4

Victor G. Vaughan,
John D. Bolesky,
Inventors,
Delos G. Haynes,
Attorney.

Patented Aug. 26, 1941

2,254,054

UNITED STATES PATENT OFFICE 2,254,054

CONTROL MEANS

Victor G. Vaughan and John D. Bolesky, Attleboro, Mass., assignors to Metals & Controls Corporation, Attleboro, Mass., a corporation of Massachusetts Application January 26, 1937, Serial No. 122,372

16 Claims. (Cl. 200—122)

This invention relates to means for regulating heating, and with regard to certain more specific features, to a method of regulating the heating of enclosed spaces, such as houses, and control means therefor.

Among the several objects of the invention may be noted the provision of means of the class described, which is particularly adapted for use in connection with a coal-fired furnace unit, and which is adapted, when so used, to control an automatic stoker for said furnace unit in such manner as to successfully maintain a sufficient fire in the furnace at all times, so that upon demand for heat, the furnace is capable of supplying heat without a considerable interval of time elapsing, but which, at the same time, is so correlated with the room thermostat or other primary control for the furnace, that the production of excessive heat at unwanted times, only in order to maintain a fire in the furnace, is avoided; and the provision of a novel form of control means of the class indicated, said control means being rugged and reliable in its operations. Other objects will be in part obvious and in part pointed out hereinafter.

The invention accordingly comprises the elements and combinations of elements, steps and sequence of steps, features of construction, and arrangements of parts, which will be exemplified in the structures and methods hereinafter described, and the scope of the application of which will be indicated in the following claims.

In the accompanying drawings, in which is illustrated one of various possible embodiments of the invention.

Similar reference characters indicate corresponding parts throughout the several views of the drawings.

The present invention relates to a combustion control means, with particular regard to apparatus of a type known as a "stoker timer" or "hold fire" control.

This form of control is commonly employed in governing the operation of coal burners and the like, where the fuel is mechanically fed from a source of supply to a combustion pot, and air is provided under forced draft in the proper amounts to support efficient combustion in the pot at a rate proportional to the fuel feed. In governing the operation of burners of this type, it is also usual to employ other control means such as, for example, room thermostats, combustion switches, and boiler temperature or pressure limiting devices. For instance, when the mechanical burner is employed to heat a building, so-called room thermostats respond to temperature changes in the living quarters and start or stop the burner in accordance with the degree of heating desired.

Combustion switches operate to shut the burner down if the flame should extinguish, thus preventing a continuing supply of unburned fuel in the combustion pot.

Limit controls act to hold the heating plant temperature or pressure within minimum and maximum preselected values.

Between periods of demand of auxiliary controls such as room thermostats and limit controls, it is common practice to discontinue the supply of fuel and air to the burner, to conserve fuel, prevent over-heating of the living quarters, and prolong the life of the burner mechanism. Yet it is necessary during such periods to maintain ignition of the fuel in some degree, so that upon renewal of demand normal combustion will be assured.

Various methods of accomplishing this have heretofore been employed, and will be briefly outlined, in order more fully to understand the present invention.

One prior method is to slow down the operation of the fuel feeding mechanism to the point where a minimum amount of fuel and air is fed to the combustion pot. This method has the disadvantages of complicating the plant by adding speed changing mechanisms and reducing the over-all efficiency of combustion by burning fuel at more than one rate of feed.

A second prior method is to operate the burner from a low limit control subjected to heating plant temperatures, the low limit control coming into play during an "off" period when the heating plant cools down to a predetermined point. This method is not entirely dependable, because it is possible for the heating plant to delay so long in cooling, under certain conditions, that the fuel in the combustion pot will have burned itself out before mechanical feed is reestablished.

A third prior method is to cause the burner to start up and run for brief intervals at certain regular intervals during its "off" period. In this way, the brief "on" or sustaining intervals need not be long enough to continue heating, but merely of sufficient duration to replace the exhausted fuel in the combustion pot with a fresh charge well ignited. Similarly, regardless of heating plant temperature or any other resultant temperature factor, this action can be initiated at intervals related to the length of time an idle fire can be held over in the combustion pot, which is the most satisfactory relation on which to base "hold fire" control.

Until the present invention, however, there have been objections to even this type of control, principally because of the limitations of the clock-driven timing apparatus employed. Unrelated as such clock-driven apparatus is to other temperature-determining factors, it can cause the burner to come on at times when it is not needed, for example, at the end of a room thermostat demand period, when continued burner operation means overheating. Moreover, such clock-driven timing devices are, as a rule, relatively costly and delicate, and complicated as to timing adjustments.

The present invention overcomes these objections to a large degree, providing a control device which is simple, rugged and relatively low in cost, and making possible a system of adjustable control wherein the elements have a reciprocal influence on each other, so that their joint action accomplishes the result desired.

Referring now more particularly to the drawings, numeral 1 indicates a panel upon which the control device of the present invention is mounted. The panel carries, along one edge thereof, electrical terminals or binding posts 3, 5, 7, 9, 11, and 13, the significance of which will hereinafter be explained. Mounted on the rear side of the panel 1 by means of pillars 15, is a rectangular box or casing 17, which houses the elements of the control proper. Inside the box 17 there is provided a suitably mounted shelf or bracket 19. Extending from the bracket 19 in the direction of the open side of box 17 (e. g., away from the panel 1), are a plurality (four in the present embodiment) of slotted pillars or posts 21. The slots of the posts 21 receive the periphery of a snap-acting dished thermostatic disc 23, which may, for example, be of the type shown and described in John A. Spencer Patent 1,448,240, dated March 13, 1923. A characteristic of the snap-acting thermostatic disc 23 is its tendency to reverse its curvature, from concave to convex, or vice versa, with a snap-action, in response to changes of ambient temperature. The peripheral mounting of the disc 23 in the post 21 leaves the central portion of the disc 23 free to undergo such snapping movement, in response to temperature changes.

Secured to the central region of the thermostatic disc 23 in such manner as to be movable therewith, is a sliding shaft 25, which extends through the shelf 19. On the other side of the shelf 19, the shaft 25 mounts a switch plate or disc 27, which in turn serves to mount diametrically oppositely disposed contact buttons or members 29 and 30. The contacts 29 and 30 are insulated from the disc 27 with a suitable dielectric material such as mica. Posts 31, mounted on the shelf 19, extend through suitable openings 33 in the disc 27, in order to prevent rotation of said disc 27 relative to the shelf 19.

Numerals 35 and 37 indicate a pair of contact plates that are positioned on the shelf 19 in such location that they are engageable by the movable contact 29 on the disc 27. Suitable insulating material 39, such as mica, insulates the contacts 35 and 37 from the shelf 19. The contacts 35 and 37 are respectively supported by terminal pieces 41 and 43, which are mounted on the side and end walls, respectively, of the box 17, but are electrically insulated therefrom.

Similarly positioned on shelf 19 to cooperate with the movable contact 30 on the disc 27 are stationary contact plates 45 and 47, which are supported on terminal pieces 49 and 51, respectively, mounted in the opposite side wall of the box 17. The stationary contact plates 35, 37, 45 and 47 are, preferably, riveted in position on the shelf 19, but in a manner such that they are electrically insulated therefrom. However, the rivets for contact plates 35 and 45 extend through to the opposite side of shelf 19, where the rivet of contact plate 35 serves to support the end of a composite thermostatic metal blade 53, and the rivet of contact plate 45 similarly supports the end of a spring or resilient blade 55. The blades 53 and 55 are so mounted that their free ends overlie one another, the blade 53 being provided with a contact button 57 cooperating with a similar contact button 59 on the blade 55. The blade 53 is thus electrically connected to the contact plate 35, while the blade 55 is connected to the contact plate 45. The blades 53 and 55 are electrically insulated from the shelf 19, as by strips of mica or the like 61.

Figure 1:
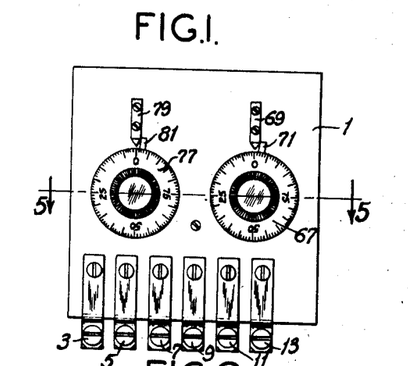
Fig. 1 is a front elevation of a control embodying the present invention.

Numeral 63 indicates a threaded bushing that is mounted in the bottom of box 17 in position coaxially with the shaft 25. The bushing 63 receives the threaded end of a shaft 65 that extends forwardly through the panel 1. In front of the panel 1 the shaft 65 mounts a knob and dial assembly 67, the periphery of the dial containing suitable indicia as indicated in Fig. 1. An index pointer 69 (Fig. 1) is provided for the purpose of reading the indicia on the dial 67. The dial 67 is preferably provided with a peripheral projection or stop 71, that abuts the pointer 69 when the dial 67 is rotated in a counterclockwise manner, to "zero" position.

The inner end of shaft 65, within the box 17, constitutes an abutment limiting the downward travel of the shaft 25. By the limitation of the downward travel of the shaft 25, the extent of reverse dishing of the thermostatic disc 23 is controlled, and this control of the extent of dishing constitutes a control of the temperature at which the thermostatic disc 23 will snap upwardly.

That is to say, if the disc 23 were permitted, by removal of the abutment provided by shaft 65 for shaft 25, to snap, upon reaching a predetermined high temperature, to its unrestrained maximum extent of concavity "hot" position, then, due to the inherent operating differential of the disc, it would not snap back to opposite concavity ("cold" position) upon cooling until a certain minimum low temperature was reached. But by restraining the extent or amount of concavity the disc assumes in its "hot" position, the temperature in a cooling phase at which it will return to its "cold" position is raised, the amount of rise being proportional, roughly to the degree of restraint imposed. In other words, the operating differential of the disc is reduced by raising the lower limiting temperature determining the "hot" to "cold" position snap. In the device herein shown, no comparable means are provided for adjusting the upper limiting temperature (e. g., "cold" to "hot" position snap) of the operating differential of the disc.

A second threaded bushing 73 is likewise mounted in the bottom of box 17, in position substantially on a line with the contact buttons 57 and 59 on the blades 53 and 55, respectively. The bushing 73 receives the threaded end of a shaft 75, which likewise projects forwardly through the panel 1 and mounts a knob and dial assembly 77 similar to the knob and dial assembly 67. The dial 77 is likewise provided with indicia and a pointer 79 and stop 81, similar to the pointer 69 and stop 71 for the dial 67.

Inside the box 17, angle bracket 83 is riveted near the bushing 73. A wire clip 85 loosely secures the bight of a U-shaped spring 87 to the bracket 83. The inner end of shaft 75 abuts one end of the spring 87, while the opposite end of the spring 87 supports an insulating button 89, (which may be made, for example, of porcelain), which button 89 underlies the contact button 59 on blade 55. By threading the shaft 75 into the bushing 73 the button 89 is pushed against the button 59, and since the spring 87 is considerably stiffer than the blade 55, the resultant effect is to change the position of the contact button 59. Since the bimetallic blade 53 curls freely under changes of ambient temperature, it will be seen that this adjustment of the position of button 59 constitutes an adjustment for the temperature at which contact buttons 59 and 57 will come together to complete a circuit. However, the spring 87 is not so stiff that it is incapable of yielding under pressure of the bimetallic blade 53, and thus no fixed abutment is presented.

The edges of the end walls of box 17 are turned outwardly to form flanges 91 and 93, respectively, which flanges 91 and 93 mount double binding post elements 95 and 97, respectively. The function of these binding posts 95 and 97 will be explained hereinafter.

Figure 6:
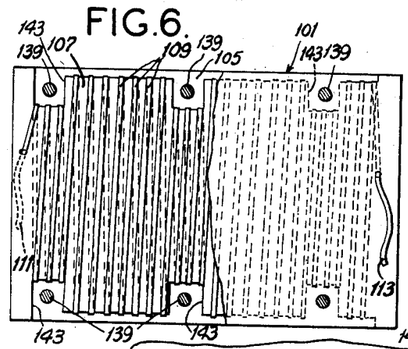
Figures 6, 7, 8 and 9, are vertical cross sections taken substantially along lines 6—6, 7—7, 8—8, and 9—9, of Fig. 5.
Figure 13:
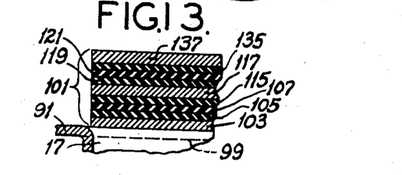
Fig. 13 is an enlarged cross section of a fragment of Fig. 5.

The edges of the side walls of the box 17 are turned outwardly to form flanges 99, which serve to mount a composite laminated heating unit 101 next to be described. Referring to Fig. 13, the lowermost layer or lamina of the heating unit 101 comprises a rectangular metallic (steel, for example) plate 103. Surmounting the plate 103 is a similarly shaped rectangle of heat-resistant, electrically insulating material 105, such as mica. Surmounting the mica sheet 105 is a mica sheet 107, somewhat smaller in size, upon which is wrapped, flatwise, a low-resistance heating coil 109. The shape of the coil 109 is indicated in Fig. 6. The ends 111 and 113 of the coil 109 extend out from the ends of the heating unit 101, for electrical connections hereinafter to be described.

Figure 7:
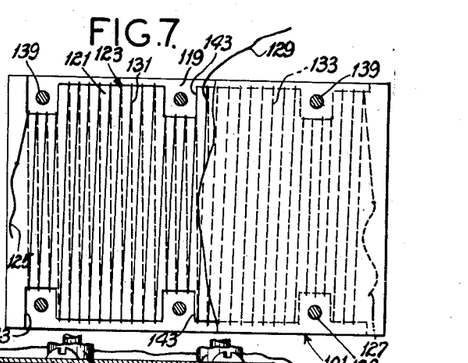
Figures 8, 9:
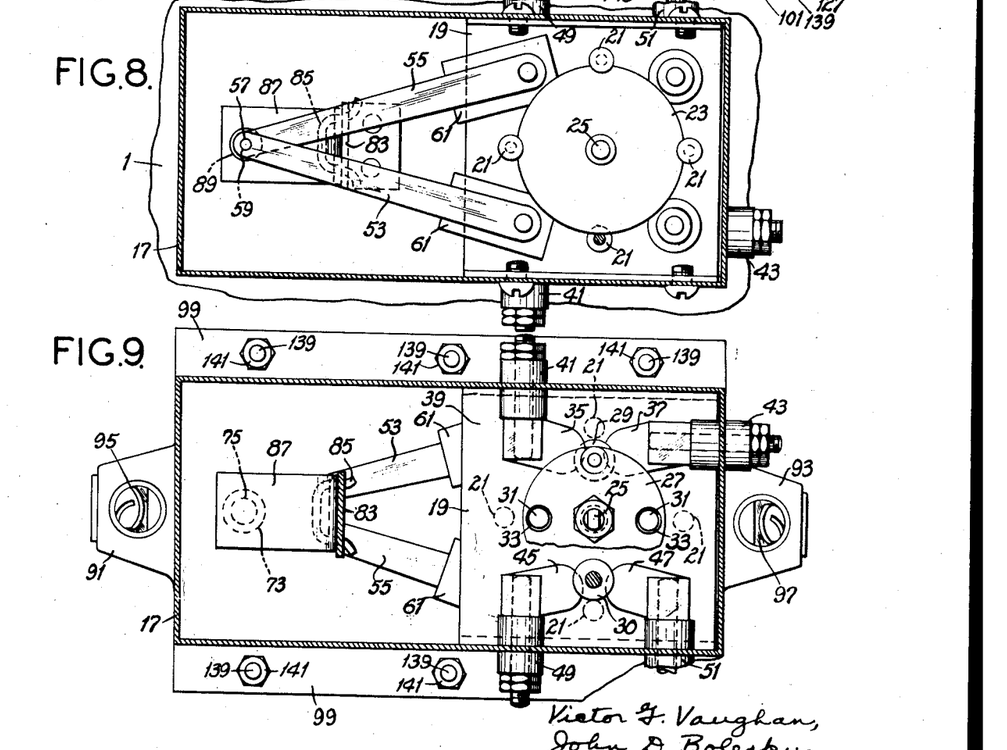

Surmounting the mica sheet 107 is a plain mica sheet 115, and surmounting this sheet 115 is a metallic plate 117 like the plate 103. Surmounting the metallic plate 117 is a mica sheet 119, and surmounting this mica sheet 119 is a mica sheet 121 upon which is wrapped a relatively high resistance electrical heating coil 123 (see Fig. 7). The ends 125 and 127 of the coil 123 extend from the ends of the heating unit 101, and a middle tap or connecting wire 129 extends from the side of the heating unit 101. The middle tap 129 divides the heating coil 123 electrically into separate, series-connected coils 131 and 133, both of which together make up the coil 123.

Surmounting the mica sheet 121 on which the coil 123 is wrapped is a mica sheet 135, and the uppermost lamina of the heating unit comprises another metallic plate 137, similar to the plates 103 and 117.

The various laminae of the heating unit 101 are secured together and to the flanges 99 by means of screws 139 and nuts 141. The mica sheets 107 and 121, which carry the windings 109 and 123, are provided with suitable notches 143 along their edges in the region occupied by the screws 139, so there is no danger of the respective winding shorting to the screws 139.

Figure 10:
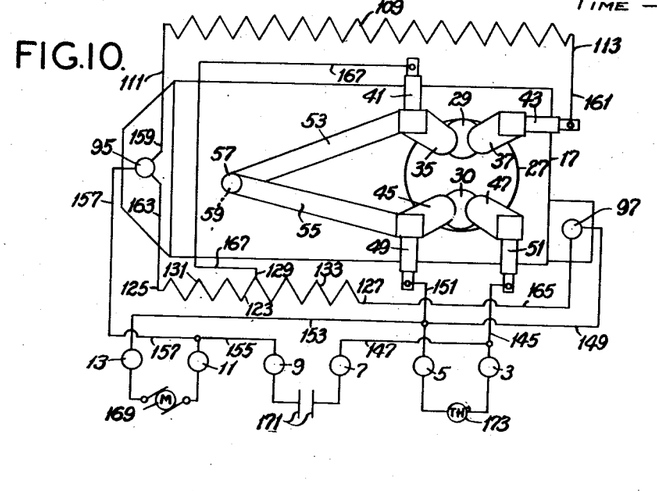
Fig. 10 is a diagram illustrating the electrical connections of the control of Fig. 1.

The electrical connections for the control just described will now be set forth. For simplicity, the electrical connections are eliminated from most of the figures of the drawings, but they are shown in diagrammatic form in Fig. 10, to which attention is now directed.

Binding post 3 is connected by a wire 145 to terminal piece 51, which is in turn connected to contact plate 47. Another wire 147 connects binding post 3 to binding post 7. Binding post 5 is connected by a wire 149 to one side of double binding post 97, by a wire 151 to terminal piece 49, and by a wire 153 to binding post 13. Binding post 9 is connected by a wire 155 to binding post 11, and by a wire 157 to one-half of double binding post 95.

One end 111 of heating coil 109 is connected to the other side of double binding post 95 by a wire 159, while the other end 113 of heating coil 109 is connected to terminal piece 43 by a wire 161. One end 125 of heating coil 123 is connected by a wire 163 to double binding post 95. The other end 127 of heating coil 123 is connected by a wire 165 to double binding post 97. The central tap 129 of heating coil 123 is connected by a wire 167 to terminal piece 41.

The system in which the control thus described is used thus comprises an automatic electric stoker mechanism of any desired type, which preferably has a motor or other electrically powered or controlled drive 169. Binding posts 11 and 13 are connected to the stoker motor 169 or power control circuit. Binding posts 7 and 9 are connected to power lines 171, such as a 110-volt A. C. line. Binding posts 3 and 5 are connected to a room thermostat 173, positioned in the space to be heated, or to some other similar auxiliary control system (which may include the customary boiler limit controls and the like).

Figures 2, 3, 5:
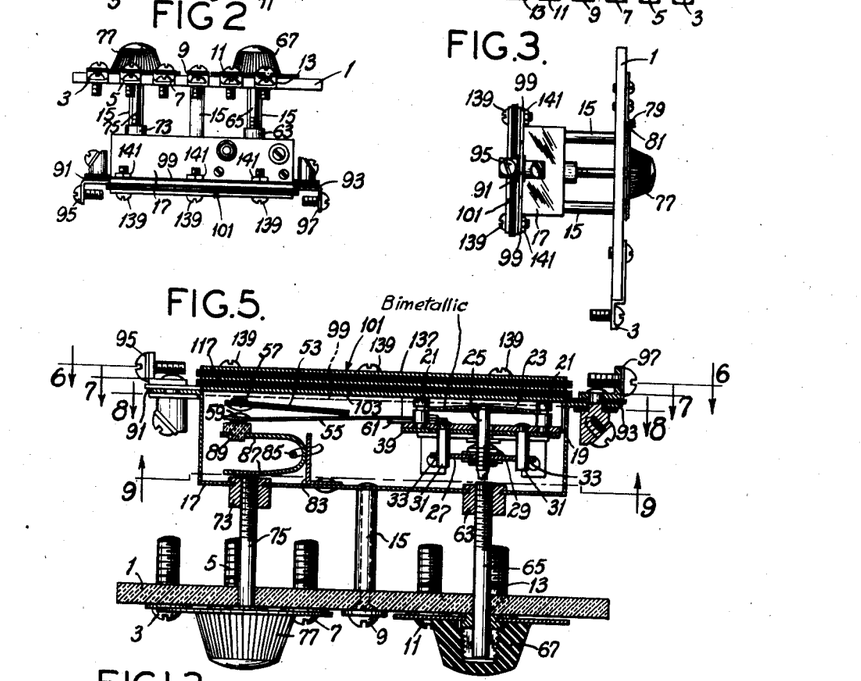
Fig. 2 is a bottom plan view of the control of Fig. 1.
Fig. 3 is an end elevation of the control of Fig. 1.
Fig. 5 is a horizontal cross section, taken substantially along line 5—5 of Fig. 1.
Figure 4:
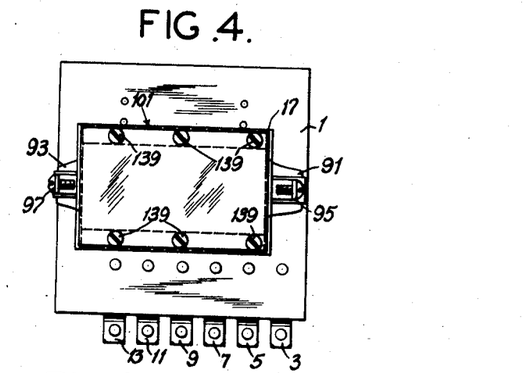
Fig. 4 is a back elevation of the control of Fig. 1.

In operation, the thermostatic disc 23 is arranged so that, upon rise of temperature, it moves from an upwardly conical position to a downwardly conical position (with respect to Fig. 5), or, in other words, breaks the connection between contact buttons 29 and 30 and their respective contact plates 35 and 37, and 45 and 47, respectively, upon rise in temperature. Upon a dropping temperature, the reverse action is true.

Similarly, the bimetallic blade 53 is so arranged that upon rise of temperature it separates its contact 57 from the contact 59 on resilient blade 55, while upon a drop of temperature, the blade 53 so moves that the contacts 57 and 59 are brought into juxtaposition. The changes in ambient temperature which bring about the movements of thermostats 23 and 53 are brought about by the heating effect or absence of it from the heating coils 109, 131, and 133.

The operation of the device as thus described is as follows:

Assume that the room thermostat 173 is satisfied (room thermostat contacts open) and the present control device has been cooling and is about ready to start a hold fire run. Thermostat 53 characteristically closes contacts 57 and 59 first as the temperature of the device falls, but, the room thermostat circuit being open, and thermostat 23 not yet being cool enough to close, nothing results. A check of the wiring will show that while binding post 9 is connected to thermostat 53 through heater 131 and terminal piece 41, terminal 49 represents a dead end, so there is no flow of current through any part of the device as yet.

In due time, however, disc thermostat 23 cools sufficiently and snaps to its closed position. When this takes place, the circuit through terminal pieces 41 and 43 is closed by bridging contact 29, and the circuit through terminal pieces 49 and 51 is closed through bridging contact 30. Now tracing from binding post 9, it will be noted that binding post 11 is energized, and tracing from binding post 7, it will be seen that binding post 13 is energized through terminal piece 51, bridging contact 30, and terminal piece 49. Thus the stoker motor 169 is started. Again tracing from binding post 9, it will be seen that heaters 109 and 131 are energized, the former by way of terminal piece 43, bridging contact 29, terminal piece 41, bimetallic blade 53, spring blade 55, terminal piece 49, bridging contact 30, terminal piece 51, and binding post 7, and the latter by way of tap 129, wire 167, terminal piece 41, bimetallic blade 53, spring blade 55, terminal piece 49, bridging contact 30, terminal piece 51, and binding post 7. Actually heaters 109 and 131 are in parallel connection to terminal piece 41, and heater 133 is shorted out between terminal pieces 41 and 49.

The result of this is that heating coils 109 and 131 raise the temperature within the device, eventually causing thermostats 53 and 23 to break their associated circuits. Thermostat 53 ordinarily breaks first and heater 133 is thus placed in series with the parallel-connected heaters 109 and 131, continuing the heating of thermostat 23. When this latter thermostat 23 breaks its connections, the stoker motor 169 is shut off and the several heaters 109, 131, and 133 are de-energized.

The cycle just described is what is called the "on" period, or period of energization of the controlled device, and is ordinarily of from, say, two to ten minutes' duration depending upon the hold fire characteristics of the particular stoker unit involved. The cycle following the "on" period is called the "off" period, or period of deenergization of the controlled device, and may vary from, say, thirty minutes to an hour and a half, depending also upon the hold fire characteristics of the stoker unit.

Figure 11:
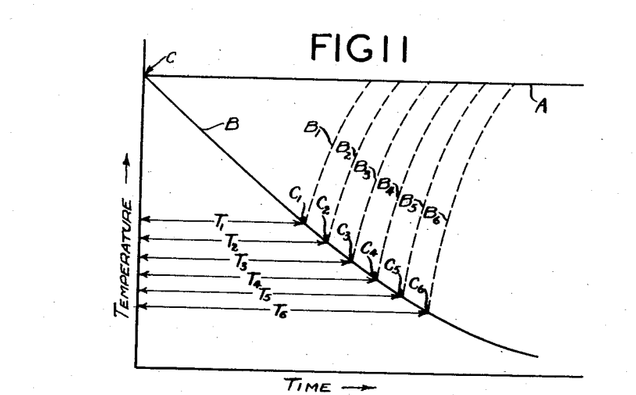
Figures 11 and 12 are graphs indicating certain time-temperature relationships hereinafter to be described.

Variations in length of "on" time settings, in view of variable settings for "off" time, are accomplished in the following manner. The thermostat 23 is the governor of "off" time, its snapping-off point (on a temperature rise) being fixed, and the adjusting mechanism (shaft 65, dial 67, etc.) associated with it controlling its snapping-on point, or in effect, its temperature differential. By lowering the snapping-on point, or, in other words, widening the differential, the cooling or "off" period is prolonged. Conversely, by raising the snapping-on point, or, in other words, narrowing the differential, the cooling or "off" period is decreased. This effect may be visualized graphically by reference to Fig. 11, which is a graph in which the abscissae and ordinates represent time and temperature, respectively. Line A represents the (fixed) snapping-off temperature of thermostat 23. Line B is the temperature curve of the interior of box 17, which is equivalent to the temperature of thermostat 23. At the abscissal origin, point C, the thermostat 23 is assumed just to have snapped "off," hence the curve B shows a cooling phase, which means that the thermostat 23 will cool. The cooling phase continues until the thermostat 23 reaches its snapping-on temperature which is adjustable by manipulation of the dial 67. Several points $C_1$, $C_2$, $C_3$, $C_4$, $C_5$, and $C_6$ are shown as exemplary of various settings of snapping-on temperatures. When the selected snapping-on point ($C_1$, $C_2$, $C_3$, $C_4$, $C_5$, or $C_6$) is reached, thermostat 23 snaps on and curve B enters a heating phase, with heaters 109 and 131 operating in parallel. For clarity, curve B is shown as a family of dotted lines $B_1$, $B_2$, $B_3$, $B_4$, $B_5$, and $B_6$, arising respectively from points $C_1$, $C_2$, $C_3$, $C_4$, $C_5$, and $C_6$. The "off" period of time is represented by the abscissal distance of point C from the selected one of points $C_1$, $C_2$, $C_3$, $C_4$, $C_5$, and $C_6$, and is indicated in Fig. 11 by the dimension lines $T_1$, $T_2$, $T_3$, $T_4$, $T_5$, and $T_6$ respectively. Since the snapping-off temperature of thermostat 23 (line A) is held constant it makes no difference how long it takes to reach this temperature, as thermostat 23 always starts its cooling cycle from the same temperature level. As already described, the cooling or "off" period following thereafter is varied by shifting the snapping-on temperature or differential.

Consider, next, the variation in setting of "on" period of the control device. This is governed by the setting of thermostat 53, which, it will be seen from the diagram, controls the operation of heater 133. The setting of thermostat 53 is accomplished by manipulation of shaft 75, dial 77, etc. When thermostat 53 is closed, heater 133 is shunted out, and when thermostat 53 is open, heater 133 is in series connection with heater 131, which latter heater may be at the same time in parallel connection with heater 109. When heater 131 and heater 109 form a parallel connection, a relatively fast heating rate results, affecting both thermostats 53 and 23. However, when thermostat 53 opens, heater 133 joins the parallel system in a series relation and the rate of heating originally started is considerably decreased, although this connection still results in a temperature rise, approaching the snapping-off point of thermostat 23.

Figure 12:
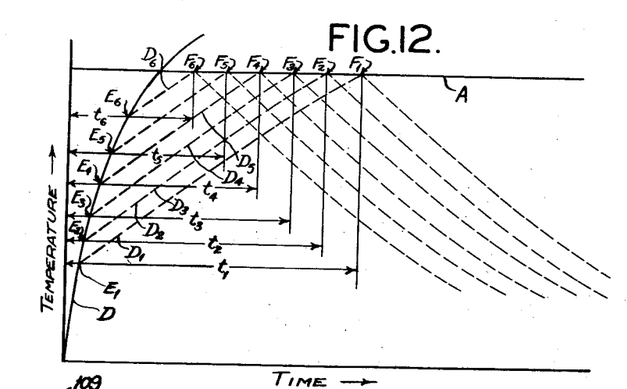

For a diagrammatic representation of this effect, see Fig. 12. In Fig. 12 the ordinates again represent temperature, and the abscissae time. Line A has the same significance as in Fig. 11. Line D is the temperature curve of the interior of box 17, which is equivalent to the temperature of thermostats 23 and 53. The initial portion of line D represents a heating phase (heaters 109 and 131 operating in parallel), and may be considered as the duplicate of any one of the curves $B_1$, $B_2$, $B_3$, $B_4$, $B_5$, or $B_6$ of Fig. 11. This heating phase continues until the temperature at which thermostat 53 opens is reached. This temperature, which is represented by points $E_1$, $E_2$, $E_3$, $E_4$, $E_5$, and $E_6$, is adjustable, by means of the settings of dial 77. When the selected temperature ($E_1$, $E_2$, $E_3$, $E_4$, $E_5$, or $E_6$) is reached, thermostat 53 opens its circuit and the arrangement of heaters is changed, heater 133 coming into series with parallel-connected heaters 109 and 131, with a consequent decrease in rate of heating. For clarity, curve D is shown, in this new phase, as a family of dotted lines $D_1$, $D_2$, $D_3$, $D_4$, $D_5$, and $D_6$, arising respectively from points $E_1$, $E_2$, $E_3$, $E_4$, $E_5$, and $E_6$. This new heating phase lasts until the temperature reaches the snapping-off temperature of thermostat 23, represented by line A. Depending upon the particular setting of thermostat 53 (and hence the curve $D_1$, $D_2$, $D_3$, $D_4$, $D_5$, or $D_6$ being followed) this value will be reached at respective points indicated as $F_1$, $F_2$, $F_3$, $F_4$, $F_5$, or $F_6$. The "on" period of time is accordingly represented by the abscissal distances between commencement of the first heating phase (the origin in Fig. 12) and the points $F_1$, $F_2$, $F_3$, $F_4$, $F_5$, and $F_6$, which distances are respectively indicated in Fig. 12 by the dimension lines $t_1$, $t_2$, $t_3$, $t_4$, $t_5$, and $t_6$.

Thus it can be seen that if the temperature at which thermostat 53 opens is raised, the time required to bring the net temperature to the snapping-off point of thermostat 23 may be lessened, hence an adjustment of length of "on" period is achieved.

As has already been outlined, the length of "off" period of the device is regulated by the length of cooling cycle of thermostat 23, which obviously will be unaffected by any cooling action of thermostat 53. Thus independently adjustable timing periods of "on" and "off" action are obtained. Since the effect sought is one that is determinable in units of time in each instance, the calibration of dials 67 and 77 is preferably in time units.

To go back to the operation of the device in typical usage, it would be well at this point to consider the other various possibilities of action. The case of a complete "on" and "off" hold fire cycle without room thermostat interruption has already been considered, whereupon the question arises as to what happens if the living quarters of a house demand heat, as they actually sometimes do, during any part of the hold fire cycle of the unit as a separate device.

Two situations of this type could develop:
I. Room thermostat 173 calls for heat during "on" period.
II. Room thermostat 173 calls for heat during "off" period.

I. Referring again to Fig. 10, if the circuit across binding posts 3 and 5 should close while the stoker motor 169 was running as during an "on" period, heaters 109 and 131 would remain energized, and 133 shunted, until thermostat 53 was sufficiently heated and opened. When thermostat 53 opened, heater 133 would then be in series with parallel-connected heaters 109 and 131, as outlined before, until thermostat 23 was sufficiently heated and opened. Then, with both thermostats 53 and 23 opened, the circuit to the stoker motor would be traced as follows: One side would be connected as shown from binding post 9 to binding post 11, the other side from binding post 7 to binding post 3, through the room thermostat (or other auxiliary control system) to binding post 5, and thence to binding post 13, continuing energization of the stoker motor. At the same time the heaters 131 and 133, now in series, would be energized from binding post 9 to heater 131 to heater 133 to binding post 5, through auxiliary or room thermostat system 173 to binding post 3 to binding post 7. Since thermostats 53 and 23 are open, heater 133 is no longer shunted, and heater 109 is not energized. The purpose of continuing the energization of heaters 131 and 133 in series, is to keep thermostats 53 and 23 heated, and thus open. Therefore, as long as the auxiliary controls, such as the room thermostat 173, call for heat, the stoker motor 169 would continue to run, and thermostats 53 and 23 would be held open. Upon termination of the room thermostat 173 demand, the stoker motor circuit 169 would be broken through the room thermostat 173, and hence the stoker would shut down. It would not start up for a hold fire "on" period until thermostats 53 and 23 had cooled sufficiently to close, or, in other words, the off period would commence at the time of the stoker shut-down, regardless of the relation of its previous hold fire cycles to the length of the demand run just completed.

At this point an improvement in stoker control means made possible by the present invention will be brought out. It is obvious that the length of the demand period of room thermostat 173 may vary considerably from cycle to cycle, depending upon outdoor temperature, weather conditions, time of day, and so on. Now in the face of varying lengths of demand periods by room thermostat 173, if the stoker control means enters an "off" period of fixed length immediately following the room thermostat demand cycle, as common mechanically operated stoker timers with cycle synchronizing means usually do, then when the room thermostat demand period is very short and the stoker fire does not have sufficient time to reach a vigorous state under its control, the "off" period of the timer, being fixed, may be too long, and the idle stoker fire may burn out or burn so low that reestablishment of normal combustion in the stoker is hampered. Maintenance of uniform temperatures in the living quarters may thus be considerably upset.

If, on the other hand, the first "off" period of the stoker timer following cessation of a demand by the room thermostat is timed in relation to the length of the room thermostat demand period, then an improvement of stoker operation results. At the same time, the "off" period of the stoker timer in question should be regulated more in the case of a short room thermostat demand period than in the case of a long one, to the extent that in event of a protracted room thermostat demand period, the normal length of the "off" cycle of the stoker control should preferably not be exceeded greatly.

In the present invention this type of compensation is brought about by so proportioning the thermal constants of the stoker timer heating elements and thermostats that the desired results are obtained. Thus, when the room thermostat 173 is independently operating the stoker, heating of the thermostats 23 and 53 takes place, either with relative rapidity and then more slowly, or at the slower rate only, as described, and, up to the degree of heating normally obtained in a regular stoker control "on" cycle, the amount of heat input to the thermostats 23 and 53 will depend on the length of the room thermostat demand period. Thus, the length of the first "off" period of the stoker timer following thereafter, or in other words, the length of the first cooling period of thermostats 23 and 53, depending on the degree of heating reached, will be in relation to the length of the room thermostat demand cycle as desired.

Figure 14:
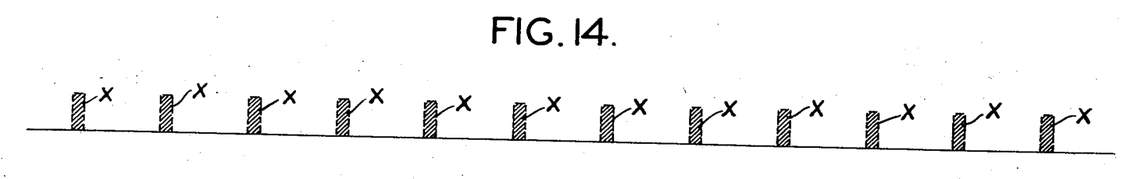
Figures 14, 15 and 16 are diagrams illustrating certain on and off periods provided by the controls of the present invention.
Figure 15:
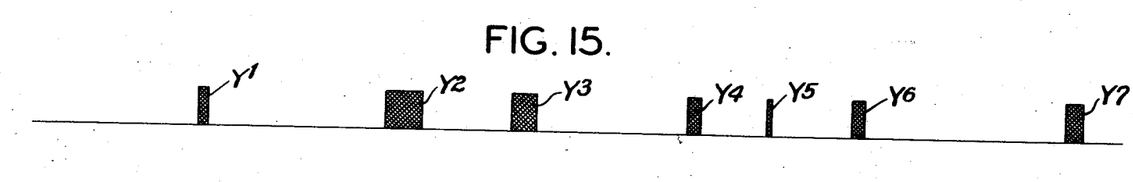
Figure 16:
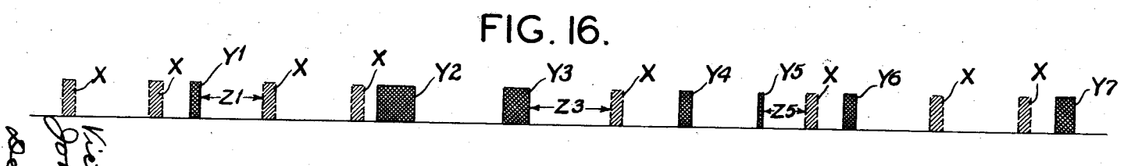

The conditions just discussed are illustrated in Figures 14, 15, and 16. In these figures, horizontal distances represent time. Fig. 14 shows the theoretical on and off operations of an undisturbed stoker timer, the shaded areas X representing the periodical "on" intervals. Fig. 15 shows an assumed set of room thermostat cycles, "on" periods (or periods of demand for heat) being differently shaded and indicated as Y1, Y2, Y3, Y4, Y5, Y6, and Y7, respectively. Fig. 16 shows the cycle of operations that take place when the stoker timer and the room thermostat of Figures 14 and 15, respectively, are combined in a single circuit, as provided by the present invention. From Fig. 16 it will readily be seen that a stoker timer "off" period always follows a room thermostat "on" period, regardless of the elapsed time since the previous stoker timer "off" period. It will further be seen that the length of the stoker timer "off" period is roughly proportional to the length of the room thermostat "on" period, up to a certain maximum "off" period; for example, "off" period Z1, which follows room thermostat "on" period Y1 (a relatively short "on" period), is itself relatively short. Similarly, "off" period Z3, which follows relatively long room thermostat "on" period Y3, is of substantially maximum length, and "off" period Z5, which follows exceedingly short room thermostat "on" period Y5, is of relatively shortest duration.

II. Again referring to Fig. 10, if the circuit across binding posts 3 and 5 should close during an "off" period of the hold fire device:

IIa. Thermostat 53 might be closed and thermostat 23 open.

IIb. Both thermostats 53 and 23 might be open.

IIa. In this case, the stoker motor 169 would be started up by the closing of the room thermostat 173. Heater 131 would be energized and heater 133 shunted, thus heater 131 would raise the temperature of thermostat 53 quite rapidly (having less resistance than the combination of heaters 131 and 133 in series) and in due time thermostat 53 would open. Upon so opening, the shunt would be removed from heater 133, which, now in series with heater 131, would continue heating of both thermostats 53 and 23 at a moderated rate while the stoker motor circuit was held closed by the room thermostat 173 as under case I.

IIb. If the room thermostat 173 should close while both thermostats 53 and 23 were open, the stoker motor 169 would start up immediately. Also, heaters 131 and 133 would be energized, in series, and would heat thermostats 53 and 23 moderately, and hold them open as under I and IIa.

Thus it will be seen how the system and control of the present invention function in a manner which is highly desirable for stoker hold-fire control, achieving all of the objects and meeting all of the difficulties heretofore set forth in this specification.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

Attention is directed to our copending application, Serial Number 388,826, filed April 16, 1941.

We claim:

1. A control comprising a first thermostat and a second thermostat, both said thermostats having a pair of operating positions assumed in response to change in temperature, heating means positioned near said thermostats in such manner as to influence their temperature, said first thermostat having associated therewith a pair of electrical switches, both of which are closed when said thermostat is in one of its positions and open when said first thermostat is in its other position, one of said switches being included in an internal circuit also including said heater, while the other of said switches controls an external circuit, said second thermostat likewise being provided with electrical switching means arranged to be closed when said second thermostat is in one position, and open when said second thermostat is in the other position, the switching means of said second thermostat being connected in said internal circuit and to said heating means in such manner that it controls the rate of heating of said heating means.

2. A control comprising a first thermostat and a second thermostat, both said thermostats having a pair of operating positions assumed in response to change in temperature, heating means positioned near said thermostats in such manner as to influence their temperature, said first thermostat having associated therewith a pair of electrical switches, both of which are closed when said thermostat is in one of its positions and open when said first thermostat is in its other position, one of said switches being included in an internal circuit also including said heater, while the other of said switches controls an external circuit, said second thermostat likewise being provided with electrical switching means arranged to be closed when said second thermostat is in one position, and open when said second thermostat is in the other position, the switching means of said second thermostat being connected in said internal circuit and to said heating means in such manner that it controls the rate of heating of said heating means, said heating means comprising electrical resistance heating elements, said switching means associated with said second thermostat being shunted across one of said elements.

3. A control comprising a first thermostat and a second thermostat, both said thermostats having a pair of operating positions assumed in response to change in temperature, heating means positioned near said thermostats in such manner as to influence their temperature, said first thermostat having associated therewith a pair of electrical switches, both of which are closed when said thermostat is in one of its positions and open when said first thermostat is in its other position, one of said switches being included in an internal circuit also including said heater, while the other of said switches controls an external circuit, said second thermostat likewise being provided with electrical switching means arranged to be closed when said second thermostat is in one position, and open when said second thermostat is in the other position, the switching means of said second thermostat being connected in said internal circuit and to said heating means in such manner that it controls the rate of heating of said heating means, and independent means for adjusting the temperature at which said first and second thermostats pass from at least one to the other of their respective positions.

4. A control comprising a first thermostat and a second thermostat, both said thermostats having a pair of operating positions assumed in response to change in temperature, heating means positioned near said thermostats in such manner as to influence their temperature, said first thermostat having associated therewith a pair of electrical switches, both of which are closed when said thermostat is in one of its positions and open when said first thermostat is in its other position, one of said switches being included in an internal circuit also including said heater, while the other of said switches controls an external circuit, said second thermostat likewise being provided with electrical switching means arranged to be closed when said second thermostat is in one position, and open when said second thermostat is in the other position, the switching means of said second thermostat being connected in said internal circuit and to said heating means in such manner that it controls the rate of heating of said heating means, and independent means for adjusting the temperature at which said first and second thermostats pass from at least one to the other of their respective positions, the adjusting means for said first thermostat being such that it controls the temperature at which said first thermostat moves from its hot to its cold position, the adjusting means for said second thermostat being such that it controls the temperature at which said second thermostat moves from its hot to its cold position.

5. A control comprising a first thermostat and a second thermostat, both said thermostats having a pair of operating positions assumed in response to change in temperature, heating means positioned near said thermostats in such manner as to influence their temperature, said first thermostat having associated therewith a pair of electrical switches, both of which are closed when said thermostat is in one of its positions and open when said first thermostat is in its other position, one of said switches being included in an internal circuit also including said heater, while the other of said switches controls an external circuit, said second thermostat likewise being provided with electrical switching means arranged to be closed when said second thermostat is in one position, and open when said second thermostat is in the other position, the switching means of said second thermostat being connected in said internal circuit and to said heating means in such manner that it controls the rate of heating of said heating means, said first thermostat comprising a snap-acting thermostatic metal disc, while said second thermostat comprises a relatively slow-acting thermostat.

6. A control comprising a snap-acting thermostatic disc and a slow-acting thermostat mounted together in a region and therein subjected to the same temperature conditions, electrical switch means controlled as to position by said thermostatic disc, and separate electric switch means controlled as to position by said slow-acting thermostat, electrical resistance heating means connected in series with said disc-controlled switch means, and having a section connected in parallel with said slow-acting thermostat controlled switch means, said heating means being adapted to control the ambient temperatre which in turn controls the operation of said thermostatic disc and slow-acting thermostat.

7. A control comprising a snap-acting thermostatic disc and a slow-acting thermostat mounted together in a region and therein subjected to the same temperature conditions, electrical switch means controlled as to position by said thermostatic disc, and separate electric switch means controlled as to position by said slow-acting thermostat, electrical resistance heating means connected in series with said disc-controlled switch means and having a section connected in parallel with said slow-acting thermostat controlled switch means, said heating means being adapted to control the ambient temperature which in turn controls the operation of said thermostatic disc and slow-acting thermostat, means for adjusting the temperature which said thermostatic disc opens its electric switch means, and means for independently adjusting the temperature at which said slow-acting thermostat opens its electric switch means.

8. A control comprising a snap-acting thermostatic disc and a slow-acting thermostat mounted together in a region and therein subjected to the same temperature conditions, electrical switch means controlled as to position by said thermostatic disc, and separate electric switch means controlled as to position by said slow-acting thermostat, electrical resistance heating means connected in series with said disc-controlled switch means, and having a section connected in parallel with said slow-acting thermostat controlled switch means, said heating means being adapted to control the ambient temperature which in turn controls the operation of said thermostatic disc and slow-acting thermostat, and means for adjusting the temperature at which said thermostatic disc opens its electric switch means, the temperature at which said thermostatic disc closes its electric switch means being relatively non-adjustable.

9. A control comprising a snap-acting thermostatic disc and a slow-acting thermostat mounted together in a region and therein subjected to the same temperature conditions, electrical switch means controlled as to position by said thermostatic disc, and separate electric switch means controlled as to position by said slow-acting thermostat, electrical resistance heating means connected in series with said disc-controlled switch means, and having a section connected in parallel with said slow-acting thermostat controlled switch means, said heating means being adapted to control the ambient temperature which in turn controls the operation of said thermostatic disc and slow-acting thermostat, and a casing enclosing both of said thermostats, said heating means forming one wall of said casing.

10. In a control of the class described, a snap-acting thermostatic disc, said disc carrying at least one movable electrical contact, a pair of stationary electrical contacts positioned to be engaged and thereby connected together by said movable contacts, said stationary contacts being normally electrically insulated from each other, and a second thermostat subjected to the same ambient conditions as said snap-acting thermostatic disc, said second thermostat carrying a movable electrical contact, and a stationary electrical contact cooperating therewith, said contacts associated with said second thermostat being connected in series with the stationary contacts associated with said thermostatic disc, and an electrical heating element positioned so as to control the ambient temperature of both said thermostatic disc and said second thermostat, said heating element being connected in circuit with the stationary contacts associated with the thermostatic disc and at least in part with the contacts associated with the second thermostat whereby its operation is affected by the activities of both thermostats.

11. In a control of the class described, a snap-acting thermostatic disc, said disc carrying at least one movable electrical contact, a pair of stationary electrical contacts positioned to be engaged and thereby connected together by said movable contact, said stationary contacts being normally electrically insulated from each other, and a second thermostat subjected to the same ambient conditions as said snap-acting thermostatic disc, said second thermostat carrying a movable electrical contact, and a stationary electrical contact cooperating therewith, said contacts associated with said second thermostat being connected in series with the stationary contacts associated with said thermostatic disc, an electrical heating element positioned so as to control the ambient temperature of both said thermostatic disc and said second thermostat, said heating element being connected in circuit with the stationary contacts associated with the thermostatic disc and at least in part with the contacts associated with the second thermostat whereby its operation is affected by the activities of both thermostats, and independent means for adjusting at least some of the operating characteristics of said thermostatic disc and said second thermostat.

12. A control comprising a thermostat having two positions, said thermostat passing from its first position to its second position on rise of its ambient temperature to a predetermined value, and from the second position back to the first position upon fall of its ambient temperature to a predetermined lower value, electrical contact means associated with said thermostat for controlling electrical circuits in accordance with the position of said thermostat, heating means included in one of said electrical circuits in such manner as to be energized only when said thermostat is in its said first position, said heating means comprising an electrical resistance heating element, a thermostatic electric switch subjected to the same ambient temperature as said first-named thermostat and shunted across a portion of said heating element, said thermosatic electric switch thereby controlling the rate of heating of said heating element, and means for adjusting the operating temperature of said thermostatic electric switch whereby to adjust the time during which it shunts out a part of said heating element, said last-named means thereby constituting means for adjustably predetermining the time taken for said first thermostat to pass from its first position to its second position.

13. A control comprising two separate thermostats mounted together in a region and therein subjected to the same ambient temperature conditions, two separate electrical switch means individually controlled as to position by said two thermostats, and electrical resistance heating means connected in series with the switch means controlled by one of the thermostats, said heating means having a section connected in parallel with the switch means controlled by the other thermostat, said heating means being adapted to control the ambient temperature which in turn controls the operation of said thermostats.

14. A time control comprising a thermostat and heating means adapted to heat said thermostat, control means actuated by said thermostat, said control means being adapted to control said heating means and having two operating positions assumed at separated temperatures one of said positions energizing said heating means and the other of said positions deenergizing said heating means, the temperature separation between said positions being adjustable to vary the timing cycle of said time control.

15. A time control comprising a first thermostat and a second thermostat and heating means adapted to heat said thermostats, control means actuated by each of said thermostats, said first thermostat's control means being adapted to control said heating means and having two operating positions assumed at separated temperatures, one of said positions energizing said heating means and the other of said positions deenergizing said heating means, the temperature separation between said positions being adjustable to vary the "off" time of said time control, said second thermostat being adjustable and its control means being adapted to vary the "on" time of said time control according to said second thermostat's adjustment setting.

16. In an automatic fuel-burning means, an automatic-control system therefor, said system including a time control for periodically causing said fuel-burning means to operate, comprising two thermostats, each of said thermostats actuating electrical switching means, one of said thermostats having a predetermined fixed switch-opening temperature and an adjustable switch-closing temperature adjustable over a range of temperatures below said opening temperature, the other of said thermostats being adjustable in its switch-closing temperature and heating means controlled by said thermostats and adapted to heat said thermostats through their operating ranges so as to cause them to cycle "on" and "off," the "off" time of said time control being adjustable by adjusting the switch-closing temperature of said first thermostat and the "on" time being adjustable by adjusting the switch-closing temperature of said second thermostat.

VICTOR G. VAUGHAN.
JOHN D. BOLESKY.